(12) United States Patent
Dionnet et al.

(10) Patent No.: US 7,603,845 B2
(45) Date of Patent: Oct. 20, 2009

(54) METHOD AND DEVICE FOR MANAGING THE OPERATION OF A NITROGEN OXIDE TRAP, AND DIAGNOSING ITS AGEING CONDITION

(75) Inventors: Bernard Dionnet, Morigny Champigny (FR); Stephane Cochet, Saint Jean de Braye (FR); Karim Guenounou, Saint Maur (FR); Marc Guyon, La Norville (FR); Laurent Leprieur, Limours (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 11/629,812

(22) PCT Filed: Jun. 16, 2005

(86) PCT No.: PCT/FR2005/050452

§ 371 (c)(1),
(2), (4) Date: Oct. 5, 2007

(87) PCT Pub. No.: WO2006/003341

PCT Pub. Date: Jan. 12, 2006

(65) Prior Publication Data
US 2008/0196387 A1  Aug. 21, 2008

(30) Foreign Application Priority Data
Jun. 17, 2004 (FR) .................................. 04 06601

(51) Int. Cl.
*F01N 3/00* (2006.01)
(52) U.S. Cl. ............................ 60/274; 60/276; 60/285; 60/295; 60/297
(58) Field of Classification Search ................. 60/274, 60/276, 277, 285, 295, 297
See application file for complete search history.

(56) References Cited

U.S. PATENT DOCUMENTS

| 6,116,021 A * | 9/2000 | Schumacher et al. ......... 60/274 |
| 6,289,673 B1 * | 9/2001 | Tayama et al. ............... 60/285 |
| 6,658,841 B2 * | 12/2003 | Beer et al. .................... 60/286 |
| 6,834,497 B2 * | 12/2004 | Miyoshi et al. .............. 60/277 |
| 7,114,329 B2 * | 10/2006 | Rosel et al. ................... 60/285 |
| 2006/0117738 A1 | 6/2006 | Cochet et al. |

FOREIGN PATENT DOCUMENTS

| DE | 198 44 082 | 10/1999 |
| FR | 2 843 044 | 2/2004 |
| WO | 98 55742 | 12/1998 |

* cited by examiner

*Primary Examiner*—Binh Q. Tran
(74) *Attorney, Agent, or Firm*—Oblon, Spivak, McClelland, Maier & Neustadt, L.L.P.

(57) ABSTRACT

The invention concerns a method which consists in arranging a oxygen probe (21) of an exhaust pipe and observing that substantial unique increase of said representative signal towards a threshold value S1 calculated from the start of the bleeding of the nitrogen oxide trap, obtained following a variation subsequent to shift of the engine from lean mixture operating conditions to rich mixture operating conditions, being used as indicator for controlling the end of the bleeding operation. The invention is characterized in that the integration of the signal representing the time between the start of the bleeding and the end of the bleeding, then the comparison of the integration value to a threshold value S2 are used for diagnosing its ageing condition. The invention also concerns a device for implementing said method.

20 Claims, 3 Drawing Sheets

METHOD AND DEVICE FOR MANAGING THE OPERATION OF A NITROGEN OXIDE TRAP, AND DIAGNOSING ITS AGEING CONDITION

BACKGROUND OF THE INVENTION

I. Field of the Invention

The invention relates to a method and a device for managing the operation of a nitrogen oxide trap, and for diagnosing its aging condition for an engine operating with a lean mixture, that is under conditions of excess oxygen with regard to the fuel.

II. Description of Related Art

Patent application FR 2 843 044 already teaches a method and a device for managing the operation of a nitrogen oxide trap for such engines.

The method according to that document uses an on/off type oxygen probe to detect the end of the activity of reducing the nitrogen oxides adsorbed on a catalyst of the nitrogen oxide trap type. According to this method, the end of bleed is detected at a standard operating temperature of the gas sensor, between about 650° and 800° C.

In that document, the end of bleed is detected by the presence of a second jump in the electrical signal delivered by the oxygen probe, placed downstream of the trap. This second jump is used as an indicator of the end of bleed.

The easy detection of the second jump according to the method of said document has the drawback that it can unfortunately be disturbed by various parameters.

The first of them is associated with the more or less fully achieved control of the composition of the exhaust gases leaving the engine, thereby causing fluctuations in the signal from the probe, and consequently false detections of the end of bleed.

The second parameter is associated with the time for detecting the first plateau, which proves too short to be always reliable.

The final parameter is associated with the need to have a sufficient probe signal amplitude for correctly detecting the second jump on the curve.

Finally, this prior method has the drawback of not allowing a diagnosis of the aging condition of a nitrogen oxide trap during its use.

The need therefore remains to have a method for managing the operation of a nitrogen oxide trap, while being able to diagnose its aging condition, and hence its operating condition for an internal combustion engine running on a lean mixture.

BRIEF SUMMARY OF THE INVENTION

The subject of the invention is therefore a method for managing the operation of a nitrogen oxide trap, and for diagnosing its aging condition for an internal combustion engine operating with a lean mixture, whereby a bleed of said nitrogen oxide trap is periodically carried out, consisting in placing a first oxygen probe on the exhaust line downstream of the nitrogen oxide trap, and in observing the change in a significant signal representative of the signal delivered by this probe.

This method is characterized in that a unique substantial increase of this representative signal toward a threshold value $S1$ from the start of the bleed of the nitrogen oxide trap, obtained after a variation subsequent to a transition of the engine from lean mixture operation to rich mixture operation, is used as an indicator to order the end of the bleed, and in that the integration of the significant signal over the time from the start of the bleed to the end of the bleed, then the comparison of the integration value with a threshold value $S2$, or the measurement of the time elapsed to reach the threshold $S1$ from the starting time of the bleed, are used to diagnose its aging condition.

The inventive method has the advantage, when the gas sensor (lambda probe) operates at low temperature (400° to 500° C.), of making the detection of the end of bleed and the diagnosis of the aging condition of the nitrogen oxide trap both reliable.

When the gas sensor (lambda probe) operates at low temperature, the inventive method has the advantage of permitting a simple and robust detection of the end of bleed of the nitrogen oxide trap.

The inventive method, in which the diagnosis is made at the standard operating temperature of the gas sensor, i.e. between about 650° and 800° C., has the advantage of being faster than at low temperature. This is because there is no change in the thermal equilibrium of the probe. Hence this allows a diagnosis as soon as the decision is taken.

A further subject of the invention is a device for managing the operation of a nitrogen oxide trap and for diagnosing its aging condition for an internal combustion engine operating with a lean mixture, for implementing the method as previously defined, the engine being equipped with an exhaust line provided with a nitrogen oxide trap.

This device is characterized in that it comprises an oxygen probe placed on the exhaust line downstream of the nitrogen oxide trap, and computation means for determining the unique substantial increase of a significant signal representative of the signal delivered by said probe from the start of the bleed, said signal being obtained after the initiation of a bleed operation, for use as indicator of the end of the bleed, and for determining the aging condition of the nitrogen oxide trap.

Preferably, the management of the operation of the nitrogen oxide trap can be carried out when the lambda oxygen probe operates at a temperature of between 400° and 500° C.

Preferably, the diagnosis can be made when the lambda oxygen probe operates at a temperature of between about 400° and 500° C., or between about 650° and 800° C.

Preferably, before or after the observation of the unique signal obtained at a temperature of about 400°-500° C., a new, complementary signal may be observed independently of the preceding signal.

This new signal may comprise a new substantial increase forming a second plateau from a first plateau having a substantially constant level, obtained after a variation subsequent to a transition of the engine from lean mixture operation to rich mixture operation. This new signal may be used as a supplementary indicator to order the end of the bleed when the lambda oxygen probe operates at a temperature of between about 650° and 800° C.

The diagnosis can also be obtained by measuring the time elapsed between the first and second plateaus to identify its aging condition when the lambda oxygen probe operates at a temperature of between about 650° and 800° C.

Preferably, complementary use can be made of a second oxygen probe placed upstream of the nitrogen oxide trap, to deliver a reference signal against which the change in the signal delivered by the first probe is compared will provide said significant signal.

The oxygen probe(s) may be selected from probes of the following type: oxygen probe of the on/off type, proportional probe, nitrogen oxide sensor whereof the oxygen concentration measurement function is used.

The first and second probes may be of a different or identical type.

The device may comprise a second oxygen probe placed upstream of the nitrogen oxide trap and connected to said computation means for sending them a reference signal.

BRIEF DESCRIPTION OF THE DRAWING

The invention will now be illustrated using the exemplary embodiments which follow, given for illustration, and which do not in any way limit the object of the invention.

Reference can be made to the drawings appended hereto in which:

FIG. 2 is a graph showing a curve representative of the signal of the oxygen probe placed downstream of the nitrogen oxide trap, for a lambda probe operating at a temperature between about 650° and 800° C., obtained by the method of application FR 2 843 044, FIG. 3 is a graph showing a curve representative of the signal of the oxygen probe placed downstream of the nitrogen oxide trap, for a lambda probe operating at a temperature of between about 400° and 500° C. according to the invention.

DETAILED DESCRIPTION OF THE INVENTION

Figure 1:
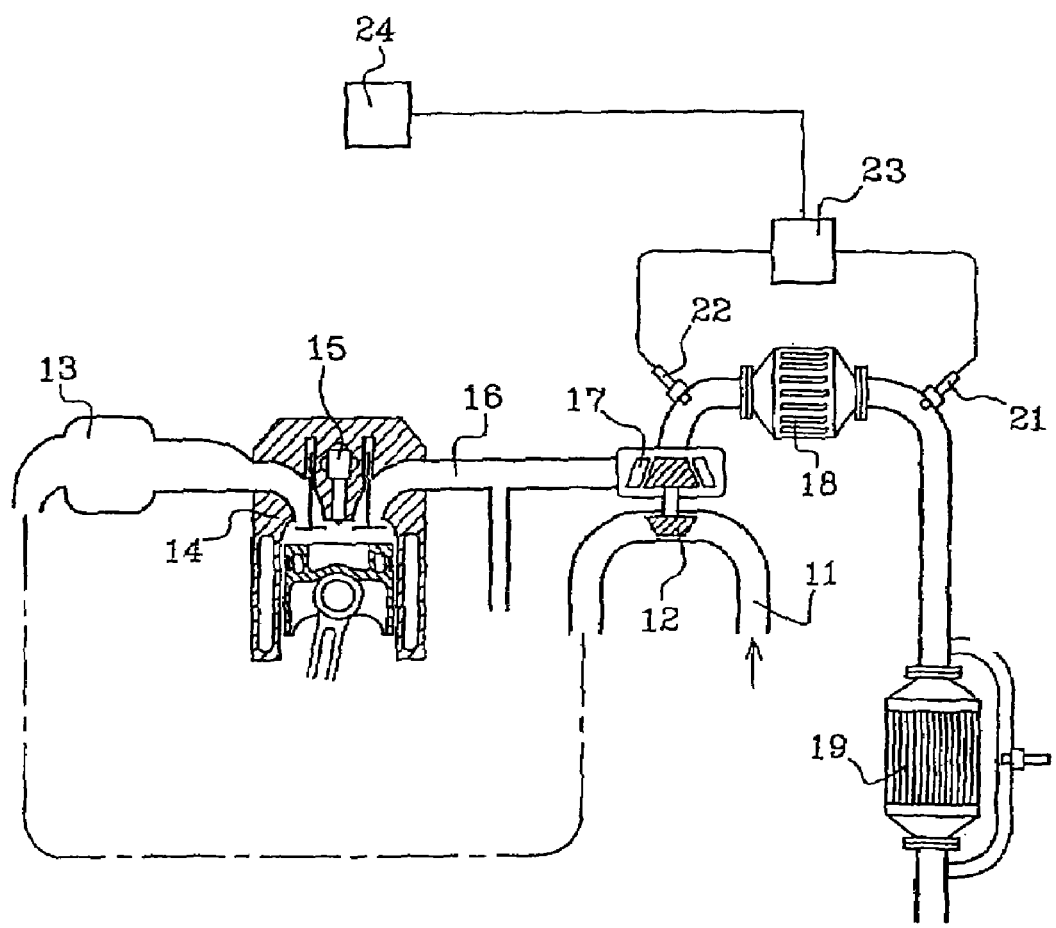
FIG. 1 is a schematic and partial representation of the gas circuit of said engine.

FIG. 1 schematically shows the components of the engine traversed by the gases, showing in succession, in the gas flow direction:

the air inlet 11, issuing from the air filter,
the suction part 12 of a turbocharger,
the intake manifold 13,
the top of the cylinder 14 equipped with an injector 15,
the exhaust manifolds 16 and the exhaust part 17 of the turbocharger,
the nitrogen oxide trap 18, the exhaust line, equipped with a particulate filter 19.

A first oxygen probe 21 is mounted downstream of the nitrogen oxide trap, and a second oxygen probe 22 is mounted upstream of the nitrogen oxide trap, both probes being connected to a computation unit 23, itself connected to an engine control unit 24.

The probes are, for example, on/off oxygen probes.

Figure 2:
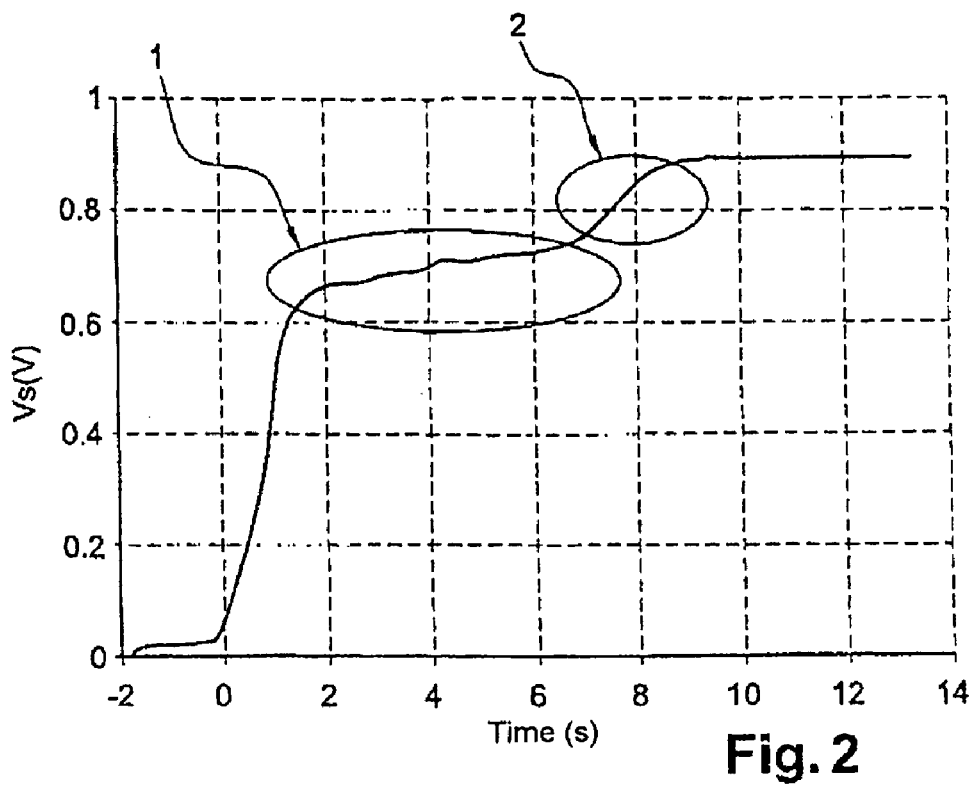
FIGS. 2 and 3 show the results of test measurements as a function of time from the initiation of a bleed. These curves show the voltage across the terminals of the probe as a function of time.

In FIG. 2, the curve is obtained with a new, stabilized nitrogen oxide trap.

The prior art method, operating at a standard temperature of use (high temperature), enables all the reducing agents to react with the oxygen present on the electrode of the probe (platinum).

This causes a reduction in the oxygen partial pressure, and hence an increase in the electromotive force of the probe. The signal from the sensor accordingly tends to rise to reach a saturation level 1, as soon as the fuel-air ratio (reducing agent/oxidizing agent ratio) is sufficient (first plateau 1).

This first plateau 1 corresponds to the increase in fuel-air ratio (reducing agent/oxidizing agent ratio) necessary to reduce the nitrogen oxides in the nitrogen oxide trap. Methane is mainly found downstream of the nitrogen oxide trap.

The second jump 2 occurs when the reducing agents upstream of the nitrogen oxide trap are used less to reduce the nitrogen oxides adsorbed in the nitrogen oxide trap, and because of the formation of hydrogen in the trap at the end of bleed.

This second increase in the concentration of reducing agents, including hydrogen, downstream of the trap, corresponds to the end of the bleed, and is indicated by a variation of the electrical signal from the sensor.

Figure 3:
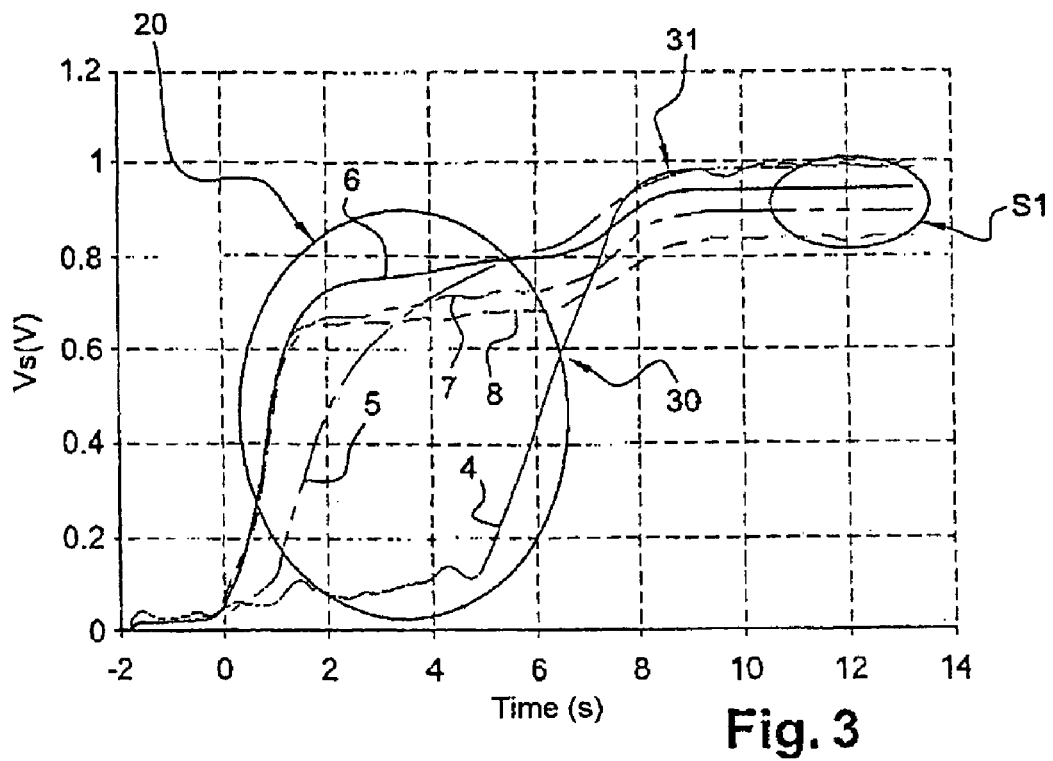

In FIG. 3, the plots 4 to 8 are obtained respectively for lambda probe temperatures of 400°, 500°, 600°, 700° and 800° C.

It may be observed that for the same aging condition of the nitrogen oxide trap, but with a low engine running temperature (plots 4 and 5), the catalytic reactions on the probe electrode are limited.

For low temperatures (plots 4 and 5), the first plateau 20 observed at high temperature (plots 6, 7 and 8), no longer exists. The reducing agents present, such as methane, do not react with the oxidizing agents. This accordingly generates a weak signal.

As the treatment of the nitrogen oxides stored in the nitrogen oxide trap proceeds, the electrical signal from the probe increases 30 to reach voltage levels 31 equivalent to the second jump 2, when the temperature of the lambda probe is high. This simple jump 30 of the probe signal observed at low temperature is in fact equivalent to the second jump 2 obtained at high temperature. It coincides with the end of the bleed and therefore with an increase in the quantity of reducing agents (hydrogen, CO and hydrocarbons) downstream of the nitrogen oxide trap.

To optimize the detection of the end of bleed, the threshold S1 can be defined according to the sensor temperature, because the decrease in the maximum voltage of the probe is a function of the increase in the sensor temperature.

Such a method for detecting the end of bleed can be used alone or in combination with the management method according to document FR 2 843 044.

When the sensor temperature, during the bleed, is low, it is preferable to increase it again upon the end of the bleed, in order to obtain a standard operating temperature of the sensor and to prevent it being fouled by soot and/or poison by waste.

Figure 4A:
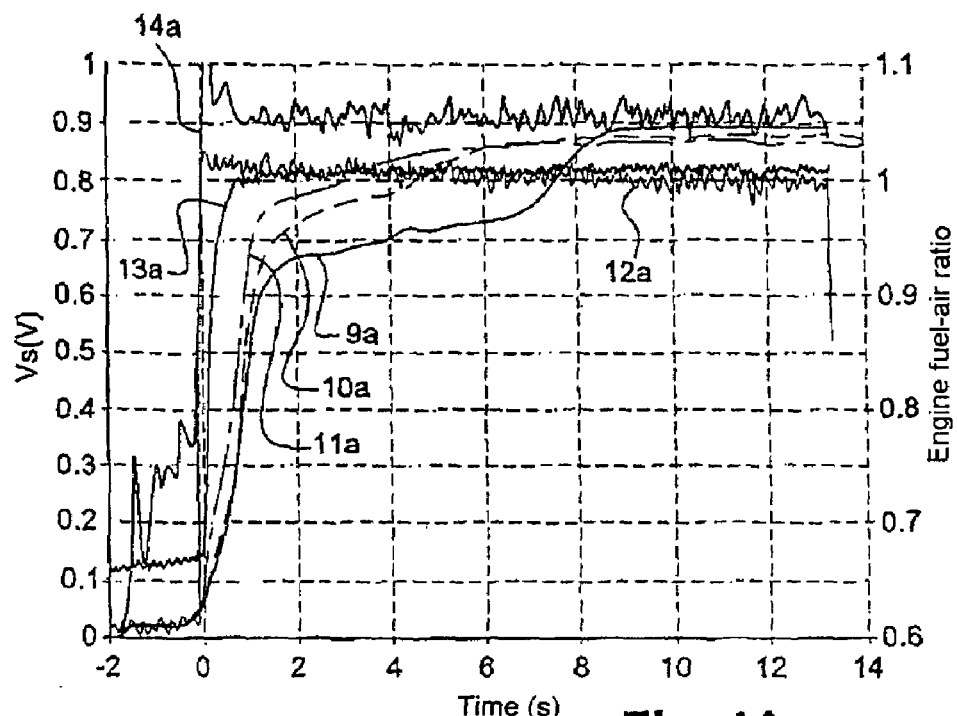
FIGS. 4A and 4B show the behavior of the oxygen probe as a function of the sensor temperature and of the chemical composition of the exhaust gases, itself a function of the aging of the nitrogen oxide trap, said probe being placed downstream of a nitrogen oxide trap, this behavior study being suitable for diagnosing its aging condition, at high temperature (FIG. 4A) and at low temperature (FIG. 4B).
Figure 4B:
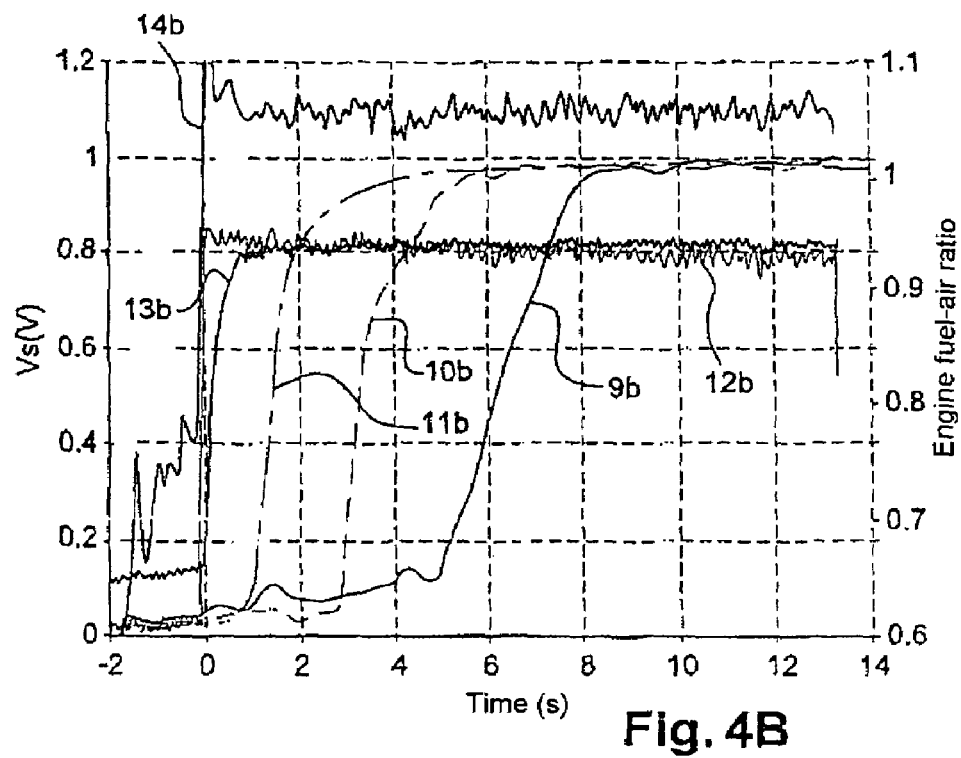

In FIGS. 4A and 4B, on the y-axis, the left-hand scale represents the voltage across the terminals of the lambda probe, and the right-hand scale the value of the fuel-air ratio signal delivered by a proportional probe.

FIGS. 4A and 4B were obtained respectively for downstream lambda probe temperatures of 700° C. and 400° C.

In FIGS. 4A and 4B, the plots 9a and 9b respectively represent the signal delivered by an oxygen probe placed downstream of the new, stabilized nitrogen oxide trap, obtained for a high and a low sensor temperature (lambda probe).

Plots 10a and 10b respectively represent the signal delivered by an oxygen probe placed downstream of the aged nitrogen oxide trap, obtained for a high and low temperature of the lambda probe.

Plots 11a and 11b respectively represent the signal delivered by an oxygen probe placed downstream of the degraded nitrogen oxide trap, obtained at high and low temperature of the lambda probe.

Plots 12a and 12b respectively represent the signal delivered by an oxygen probe placed upstream of the nitrogen oxide trap, obtained for a standard operating temperature of the probe.

Plots 13a and 13b respectively represent the signal delivered by a proportional probe placed upstream of the nitrogen oxide trap, without pumping current, obtained for a standard operating temperature of the probe.

Plots 14a and 14b respectively represent the fuel-air ratio signal delivered by a proportional probe placed upstream of the nitrogen oxide trap, obtained for a standard operating temperature.

From these plots, it may be observed that the change in the behavior of the probe at low and high temperature can allow a diagnosis of the nitrogen oxide trap which consists in identifying its aging condition.

To optimize this diagnosis, it is possible to integrate the measured electrical signal between the time when the bleed is initiated to the time corresponding to the end of the bleed, that is up to the level of the second jump for high temperatures, or a predefined voltage level for low temperatures.

At low as well as high temperature, the mathematical integration of the signal is preferably higher than a predefined value (also called threshold S2) to confirm the satisfactory operation of the nitrogen oxide trap.

This comparison of the integration value is made at a known operating point of the engine, such as, for example, during a bleed phase with an engine fuel-air ratio of about 1.05.

According to another alternative for diagnosing the nitrogen oxide trap, it is possible to measure the time necessary to reach the second jump at high temperature, or the predefined threshold at low temperature, using as a reference the time corresponding to the enrichment of the exhaust gases indicating the start of the bleed.

This measured time actually corresponds to the time necessary to purge the nitrogen oxides from the trap.

From these measurements, it clearly appears that this bleed time decreases in proportion to the aging of the nitrogen oxide trap.

The diagnosis of the aging condition of the nitrogen oxide trap is hence made by comparing this measured time with a predefined value.

If this measured time, under predefined engine operating conditions, like those of the engine fuel-air ratio, falls below the predefined threshold, it is then possible to diagnose the nitrogen oxide trap as defective.

According to a final alternative, this diagnosis can be made by comparison with a second probe of the same type as the one used for the measurements (oxygen probe) or of a different type (amperometric "fuel-air ratio" probe or amperometric "nitrogen oxide" sensor).

For ammeter sensors, it is possible to use either the "fuel-air ratio" signal delivered, or the signal of the reference cell by imposing a zero pumping current to have an on/off type oxygen probe.

This second probe, which is accordingly placed upstream of the nitrogen oxide trap, is used as a reference.

If the difference in behavior between these upstream and downstream probes becomes too slight, it is then possible to diagnose faulty operation of the nitrogen oxide trap.

The trap is diagnosed as defective when the difference in behavior is lower than a predefined threshold.

The device for implementing the inventive method operates as follows.

The temperature of the oxygen probe is regulated, or controlled, with the heating voltage to obtain a low temperature (about 400°-500° C.) to avoid catalytic reactions of methane mainly during the useful phase of the nitrogen oxide bleed.

This facilitates the diagnosis of the nitrogen oxide trap and the detection of the end of bleed. These operations are less sensitive to changes in behavior of the sensor due to its aging, and also less sensitive to the catalyst formulations.

A similar procedure can be followed for high temperatures.

The invention claimed is:

1. A method for managing an operation of a nitrogen oxide trap, and for diagnosing an aging condition of the nitrogen oxide trap for an internal combustion engine, comprising:
   bleeding said nitrogen oxide trap;
   observing a change in a significant signal representative of a signal delivered by a first oxygen probe placed on an exhaust line downstream of the nitrogen oxide trap, wherein a unique substantial increase of the significant signal toward a threshold value S1 from a start of the bleeding the nitrogen oxide trap, obtained after a variation subsequent to a transition of the engine from a lean mixture operation to a rich mixture operation, is an indicator to order an end of the bleeding;
   determining whether the first oxygen probe operates at a high temperature or a low temperature;
   when the first oxygen probe operates at the low temperature, integrating the significant signal over a time from the start of the bleeding to the end of the bleeding to determine an integration value, and comparing the integration value with a threshold value S2 to diagnose the aging condition of the nitrogen oxide trap, and
   when the first oxygen probe operates at the high temperature, measuring the time elapsed to reach the threshold S1 from the start of the bleeding to diagnose the aging condition of the nitrogen oxide trap.

2. The method as recited in claim 1, wherein the first oxygen probe operates at the low temperature when the first oxygen probe operates between 400° and 500° C.

3. The method as recited in claim 1, wherein the first oxygen probe operates at the high temperature when the first oxygen probe operates between about 650° and 800° C.

4. The method as recited in claim 1, further comprising:
   utilizing, when the first oxygen probe operates at the high temperature and after the observing the change in the significant signal, a new signal comprising a new substantial increase forming a second plateau from a first plateau having a substantially constant level, obtained after the variation subsequent to the transition of the engine from the lean mixture operation to the rich mixture operation, as a supplementary indicator to order the end of the bleeding.

5. The method as recited in claim 4, further comprising:
   measuring a time elapsed between the first plateau and the second plateau to identify the aging condition of the nitrogen oxide trap when the first oxygen probe operates at the high temperature of between about 650° and 800° C.

6. The method as recited in claim 1, further comprising:
   utilizing a second oxygen probe, placed upstream of the nitrogen oxide trap, to deliver a reference signal against which a change in the signal delivered by the first oxygen probe is compared to provide said significant signal.

7. The method as recited in claim 1, wherein the first oxygen probe is selected from probes of the following type: an oxygen probe of an on/off type, a proportional probe, and a nitrogen oxide sensor utilizing an oxygen concentration measurement function.

8. The method as recited in claim 6, wherein the first probe and the second probe are a different type.

9. A device that manages an operation of a nitrogen oxide trap and that diagnoses an aging condition of the nitrogen oxide trap for an internal combustion engine, comprising:
  a first oxygen probe placed on an exhaust line downstream of the nitrogen oxide trap;
  temperature means for determining whether the first oxygen probe operates at a high temperature or a low temperature; and
  computation means for determining a unique substantial increase of a significant signal representative of a signal delivered by said probe from a start of bleeding the nitrogen oxide trap, the unique substantial increase of said significant signal toward a threshold value S1 being an indicator of an end of the bleeding, and for determining the aging condition of the nitrogen oxide trap, wherein
  when the temperature means determines that the first oxygen probe operates at the low temperature, the computation means integrates the significant signal over a time from the start of the bleeding to the end of the bleeding to determine an integration value and compares the integration value with a threshold value S2 to diagnose the aging condition of the nitrogen oxide trap, and
  when the temperature means determines that the first oxygen probe operates at the high temperature, the computation means measures the time elapsed to reach the threshold S1 from the start of the bleeding to diagnose the aging condition of the nitrogen oxide trap.

10. The device as recited in claim 9, further comprising:
  a second oxygen probe placed upstream of the nitrogen oxide trap and configured to send a reference signal to said computation means.

11. The method as recited in claim 6, wherein the first probe and the second probe are an identical type.

12. The device as recited in claim 9, wherein the first oxygen probe operates at the low temperature when the first oxygen probe operates between 400° and 500° C.

13. The device as recited in claim 9, wherein the first oxygen probe operates at the high temperature when the first oxygen probe operates between about 650° and 800° C.

14. The device as recited in claim 9, wherein,
  when the first oxygen probe operates at the high temperature of between about 650° and 800° C., and after the increase of the significant signal, a new signal comprising a new substantial increase forming a second plateau from a first plateau having a substantially constant level is obtained by the computation means,
  the new signal is obtained after a variation subsequent to a transition of the engine from a lean mixture operation to a rich mixture operation, and
  the new signal is a supplementary indicator to order the end of the bleeding.

15. The device as recited in claim 14, wherein the computation means measures a time elapsed between the first plateau and the second plateau to identify the aging condition of the nitrogen oxide trap.

16. A device that manages an operation of a nitrogen oxide trap and that diagnoses an aging condition of the nitrogen oxide trap for an internal combustion engine, comprising:
  a first oxygen probe placed on an exhaust line downstream of the nitrogen oxide trap;
  a computation unit configured to determine whether the first oxygen probe operates at a high temperature or a low temperature, and configured to determine a unique substantial increase of a significant signal representative of a signal delivered by said probe from a start of bleeding the nitrogen oxide trap, the unique substantial increase of said significant signal toward a threshold value S1 being an indicator of an end of the bleeding and for determining the aging condition of the nitrogen oxide trap, wherein
  when the computation unit determines that the first oxygen probe operates at the low temperature, the computation unit integrates the significant signal over a time from the start of the bleeding to the end of the bleeding to determine an integration value and compares the integration value with a threshold value S2 to diagnose the aging condition of the nitrogen oxide trap, and
  when the computation unit determines that the first oxygen probe operates at the high temperature, the computation unit measures the time elapsed to reach the threshold S1 from the start of the bleeding to diagnose the aging condition of the nitrogen oxide trap.

17. The device as recited in claim 16, further comprising:
  a second oxygen probe placed upstream of the nitrogen oxide trap and configured to send a reference signal to said computation unit.

18. The device as recited in claim 16, wherein the first oxygen probe operates at the low temperature when the first oxygen probe operates between 400° and 500° C.

19. The device as recited in claim 16, wherein the first oxygen probe operates at the high temperature when the first oxygen probe operates between about 650° and 800° C.

20. The device as recited in claim 16, wherein,
  when the first oxygen probe operates at the high temperature of between about 650° and 80020 C., and after the increase of the significant signal, a new signal comprising a new substantial increase forming a second plateau from a first plateau having a substantially constant level is obtained by the computation unit,
  the new signal is obtained after a variation subsequent to a transition of the engine from a lean mixture operation to a rich mixture operation,
  the new signal is a supplementary indicator to order the end of the bleeding, and
  the computation unit measures a time elapsed between the first plateau and the second plateau to identify the aging condition of the nitrogen oxide trap.

* * * * *